Figure 1:
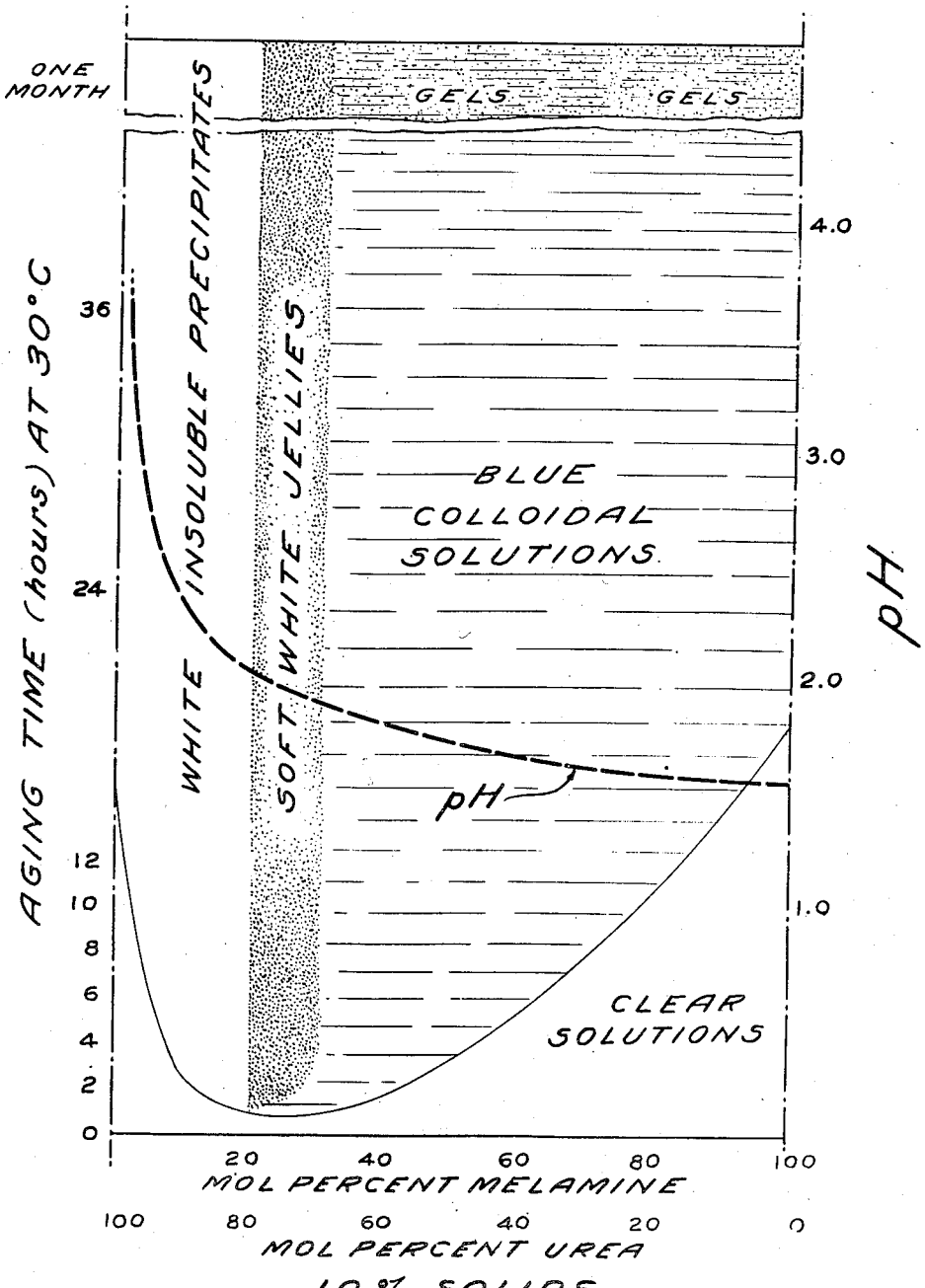

INVENTORS
H. P. WOHNSIEDLER,
W. M. THOMAS,
BY
ATTORNEY

Patented Oct. 18, 1949

2,485,079

UNITED STATES PATENT OFFICE 2,485,079

COLLOIDAL MELAMINE-UREA-FORMALDEHYDE COPOLYMER SOLUTIONS

Henry P. Wohnsiedler, Darien, and Walter M. Thomas, Stamford, Conn., assignors to American Cyanamid Company, New York, N. Y., a corporation of Maine Application January 4, 1944, Serial No. 516,932

1 Claim. (Cl. 260—29.4)

This invention relates to resinous copolymers of melamine and urea with formaldehyde in the form of colloidal aqueous solutions. The invention includes the resin solutions themselves, their methods of preparation, cured resins obtained therefrom and preferred modes of application of the colloidal resin to other substances.

We have discovered that copolymer resins can be prepared from melamine, urea and formaldehyde in the form of colloidal aqueous solutions wherein the resin has a number of unusual and extremely important properties. One of the principal characterizing features of our new copolymer resin solutions is the fact that a positive electrical charge is carried by dispersed particles thereof, as shown by their migration toward the cathode upon electrophoresis of the solution. Another important advantage resides in the fact that the dispersed resin copolymer is in a partially polymerized condition and can therefore be completely and rapidly cured in a relatively short period of time after it has been deposited by absorption, adsorption, electro-deposition, ion exchange, drying, precipitation or otherwise.

In order to produce the colloidally dispersed, cationic copolymer resins of our invention we first prepare an acidified aqueous solution of formaldehyde condensation product of melamine and urea containing at least about 0.7-1 mol of melamine for each 4 mols of urea and convert the resin into the desired colloidal copolymer by aging the solution. The term "formaldehyde condensation product of melamine and urea" includes condensation products prepared by any one or more of the following procedures:

(a) Co-reacting melamine, urea and formaldehyde simultaneously.

(b) Mixing substantially monomeric monomethylol or dimethylol urea solutions with solutions of methylol melamines containing 2 to 6 mols of combined formaldehyde.

(c) Reacting urea, melamine and aqueous formaldehyde in the presence of hydrochloric acid.

(d) Reacting melamine hydrochloride with urea and aqueous formaldehyde. In (c) and (d) it is understood that no more acid need be added.

We have found that wide variations in the properties of the melamine-urea-formaldehyde copolymers can be obtained by varying the ratio of urea to melamine, and it is an important advantage of the invention that the urea content can be varied in this manner throughout an extremely wide range. Although at least about 15-20 mol percent of the total quantity of melamine+urea must be present as melamine, the quantity of urea may vary from this maximum to as low as 1% if desired while still retaining the advantages of the invention. It is therefore possible to obtain melamine-urea-formaldehyde copolymers in the form of colloidal aqueous solutions which possess most of the desirable properties of colloidal cationic melamine-formaldehyde resin solutions, but which are much cheaper because they contain a major percentage of urea and only a relatively small quantity of melamine. Thus, for example, we have found that a formaldehyde condensation product containing 70 mol percent of urea and only 30 mol percent of melamine will form a colloidal cationic solution that can be applied to paper stock such as kraft or sulfite wood pulp by the "beater" process, and that paper of good wet strength is obtained when the treated stock is formed into paper and the resin is cured by heating in the usual manner.

The behavior of typical acidified aqueous solutions of formaldehyde condensation product of melamine and urea toward varying quantities of acid is rather unusual. In determining the amounts of acid which produce the desired colloidal copolymer resin solutions we found that the ratio of acid to melamine is the controlling factor; i.e., the colloidal copolymer is obtained when the proper ratio of acid to melamine is maintained and this ratio does not change materially with varying amounts of urea except when the urea: melamine ratio is very high. The exact molar ratio of acid to melamine varies with the resin solids content at which the solution is aged. Thus, for example, the colloidal copolymer is formed in a 10% aqueous solution when as little as about 0.2 mol of a strong acid such as hydrochloric acid or phosphoric acid is present for each mol of melamine.

The amount of acid required to produce the colloidal copolymer solutions will also vary to a certain extent with the concentration of resin solids in the solution being aged. In general, the amount of acid required for a given type of product is less for very low or very high resin solids content, such as 1–6% and 35–50% resin solutions than for the solutions of intermediate strength which are usually employed in the commercial preparation of these products. Ordinarily the copolymer resin solutions are prepared at a resin solids content of about 10–20%, and therefore the proper quantity of acid can be expressed in terms of resin solutions of medium concentration. On this basis the amounts of acid that will produce the colloidal solutions of melamine-urea-formaldehyde copolymer resins upon aging of the originally clear acidified aqueous solutions are sufficient to produce a pH within the range of about 0.25–4 when the glass electrode pH is measured at a resin solids content of 10%.

The aging time of the acidified aqueous solutions of melamine-urea-formaldehyde condensation product will vary both with the quantity of acid used and with the temperature. At elevated temperatures the aging time is greatly reduced, but in this respect the copolymer resins are not as sensitive as are the corresponding acidified solutions of melamine-formaldehyde resin and the aging may be conducted by refluxing the solution if desired. However, it is much simpler and greatly preferable to age the solutions at ordinary room temperatures of about 25–30° C. or at only slightly elevated temperatures, since the degree of polymerization may be much more closely controlled. When the desired colloidal condition has been obtained in the solution the polymerization may be checked by cooling or by dilution with water, or both.

The colloidal aqueous solutions of melamine-urea-formaldehyde copolymers of the present invention are identified by the following properties: they possess a blue colloidal haze and exhibit a definite Tyndall effect under the influence of a beam of light or in the dark-field microscope. Particles of the dispersed copolymer resin appear to be ionized in solution and possess definite cationic properties as shown by their migration toward the cathode upon the passage of a direct current of electricity through the solution, and under the proper conditions the resin may be actually electroplated by this method. The colloidal resin will also deposit from solution upon negatively charged materials such as cellulose in the form of an extremely thin layer, and this property constitutes the basis of the "beater" treatment of cellulosic paper pulp referred to above. The colloidal resin solutions are infinitely dilutable with water and may also be diluted with small quantities of acid having a strength equivalent to the acid already present, but the colloid is precipitated by the addition of even small quantities of stronger acids such as 6 normal hydrochloric acid and this constitutes a very delicate test to determine when the colloidal copolymer resin has been formed in the solution. The colloid is also precipitated by the addition of alkalies such as caustic soda and electrolytes such as aluminum sulfate, sodium chloride and the like.

A specific embodiment of the invention is illustrated on Fig. 1 of the attached drawing, which is a graph showing the characteristics of 10% aqueous solutions of formaldehyde condensation products of melamine and urea containing one mol of hydrochloric acid for each mol of melamine as the molecular ratio of melamine to urea is increased. This figure also shows the characteristic change which occurs in the acid-type solutions upon aging when sufficient melamine is present to result in the formation of the colloidal copolymer solutions of the invention.

Referring to this drawing, it will be seen that at the solids concentration used white insoluble precipitates are formed immediately or within a few hours when resin solutions containing less than 20 mol percent of melamine are acidified. In the range of about 20 to about 30 mol percent of melamine the blue colloidal solutions which first form are quickly transformed into soft white jellies. When the resinous formaldehyde condensation product of melamine and urea contains more than about 30 mol percent of melamine, based on the total content of melamine+urea, the blue colloidal solutions are stable for considerable periods of time and eventually transformed upon continued aging either into blue gels or white gels, depending on the quantity of acid present. The blue gels are at first hydrophilic and can be redispersed by agitation, but upon continued aging they become hydrophobic in character. The aging time is shorter in solutions containing smaller quantities of acid and a higher ratio of urea to melamine than in solutions of higher acid and melamine content, but in all cases the desired blue colloidal solutions are eventually obtained. In these solutions a positive electrical charge is carried by dispersed particles of the copolymer resin and the characteristic advantages of the present invention are obtained.

Although our invention is not limited by any theory of the reaction involved, we offer the following as a probable explanation of the formation of the colloidal resin copolymer solutions which have been described. It is a known fact that both melamine-formaldehyde condensation products and urea-formaldehyde condensation products will undergo a progressive polymerization from the substantially monomeric form in which they are first obtained to a polymerized condition in which they are insoluble in water. Syrups prepared by reacting either melamine or urea with aqueous formaldehyde solutions are said to be hydrophobe when this polymerization has progressed to the stage where the addition of substantial quantities of water will cause a precipitation of the resin. We believe that although a change similar to the formation of a hydrophobe syrup may take place during the aging of the acid solutions of melamine-urea-formaldehyde condensation products which we have described, the free acid present prevents the resin from becoming hydrophobic. The molecules of the condensation product are therefore retained in a soluble condition in which they are free to continue the process of combining with each other, and therefore attain a degree of polymerization sufficient to render the resin particles colloidal in character and size. This polymerization continues during further aging of the colloidal solution until the resin eventually forms a thixotropic gel, which is finally converted into the water-insoluble stage by further reaction.

The invention will be further illustrated by the following specific examples. It should be understood, however, that these examples are given primarily for purposes of illustration and that the invention in its broader aspects is not limited thereto.

Example 1

A melamine-urea-formaldehyde condensation product was prepared by heating together 12 grams (0.2 mol) of urea, 37.8 grams (0.3 mol) of melamine and 105.1 grams of 37.1% aqueous formaldehyde solution. This amount of formaldehyde was equivalent to 39 grams (1.3 mol) of $CH_2O$.

The slurry, which had a pH of 6.5, was heated 80 minutes on a water bath at 60° C. The final pH was 7.2, free formaldehyde was 6.3% of the total and a sample of the syrup hydrophobed on dilution with water to 13.5% solids.

The syrup was then diluted to a final solids concentration of 15% by the addition of water having 11 grams (0.3 mol) of HCl dissolved therein. This formed a clear solution having a pH of about 1.8 which upon aging for about 8-10 hours at room temperature developed a blue haze indicative of the formation of a colloidal solution. This haze became more pronounced during the course of an additional two days storage of the solution at room temperature. After this time the colloidal solution slowly set to a blue gel which at first was thixotropic in character and could be redispersed in water by agitation, but finally became water-insoluble upon continued aging.

Example 2

A 37% aqueous formaldehyde solution was adjusted by the addition of formic acid until 100 cc. had a titration of 5.7 cc. of N/10 alkali. To 73 parts by weight of this solution there was added 27 parts of urea and 72.6 parts of triethanolamine. The mixture was heated to 35° C. with agitation and maintained at this temperature until the free formaldehyde content was reduced to 10%. The final product was a white cream which was soluble in water to a 10% solution having a pH of 7.2-7.3.

A mixture of 378 parts by weight of melamine and 1000 parts of 30% aqueous formaldehyde solution was heated at a pH of 9.0 for about 30 minutes, cooled, and the resulting crystals separated and dried. The product was a methylol melamine having a ratio of combined formaldehyde to melamine of 3.33:1.

Water solutions of the two resins were mixed in various proportions, acidified with hydrochloric acid and diluted to 10% resin solids. The mixtures were then aged at room temperatures. The initially water-clear solutions either yielded amorphous white precipitates or passed into blue colloidal solutions. Upon continued aging these blue solutions either formed soft white jellies or, at higher melamine : urea ratios, were converted into hydrophilic and eventually into hydrophobic blue gels. The results obtained when a 1:1 molecular ratio of hydrochloric acid to melamine was maintained are shown in Fig. 1 of the drawings.

Referring to Fig. 1 it will be seen that white precipitates are quickly obtained when the resin mixture contains more than 80 mol percent of urea resin. Blue colloidal solutions are formed with all other urea-melamine ratios, but these are soon converted into soft white jellies when the dispersed copolymer contains about 70-80 mol percent of urea. Within the range from appreciable quantities (1% or more) up to 70 mol percent of urea in the copolymer the blue colloidal solutions are stable for some time, but eventually pass into gels which are at first water-dispersible upon agitation but which finally become water-insoluble. It is within this range, wherein the melamine-formaldehyde and urea-formaldehyde resins have copolymerized to form dispersed resin particles that are colloidal in character and size and have not reached the stage of water-insoluble gel formation, that the resin particles carry a definite positive electrical charge.

Example 3

Neutral melamine-urea-formaldehyde syrups were prepared in which the ratio of urea to melamine was varied in steps of 10 mol percent. An all-melamine-formaldehyde syrup and an all-urea-formaldehyde syrup were also made to complete the series. The syrups were numbered as follows:

| Syrup No. | Mol percent Melamine | Mol percent Urea |
|---|---|---|
| 1 | 10 | 90 |
| 2 | 20 | 80 |
| 3 | 30 | 70 |
| 4 | 40 | 60 |
| 5 | 50 | 50 |
| 6 | 60 | 40 |
| 7 | 70 | 30 |
| 8 | 80 | 20 |
| 9 | 90 | 10 |
| 10 | 100 | None |
| 11 | None | 100 |

In all the melamine-urea condensation products the quantity of formaldehyde was equal to 3 mols for each mol of melamine plus 2 mols for each mol of urea and the reaction was conducted in the following manner. The pH of each slurry was adjusted to 7.2 after which it was heated at 70° C. until the first hydrophobe was reached. In syrups Nos. 2-9 inclusive this took place in 25 to 35 minutes heating with the mixtures of higher urea content requiring the longer time. Syrup No. 1 required 85 minutes heating.

Syrup No. 11 was made by refluxing 2 mols of neutralized formalin with 1 mol of urea.

Syrup No. 10 was prepared by heating a mixture of 1 mol of melamine and 3 mols of 37% aqueous formaldehyde neutralized with NaOH to a pH of 7.2 for 30 minutes at 60° C.

Each syrup was divided into a number of portions, which were dissolved in water containing varying amounts of hydrochloric acid. All the solutions were made to contain 10% resin solids and were aged at 25-30° C.

White precipitates were formed immediately in all the solutions of syrup No. 1 and syrup No. 11. Precipitation also occurred in all the solutions of syrup No. 2 containing hydrochloric acid. A blue colloidal haze also formed in those solutions of syrups Nos. 3 to 10 that contained more than about 0.25-0.5 mols and not more than about 2.5 mols of HCl for each mol of melamine.

The types of products obtained upon aging with varying quantities of hydrochloric acid are illustrated by syrup No. 6, which was prepared by reacting 2 mols urea, 3 mols melamine and 13 mols formaldehyde for 30 minutes at 70° C. and then cooling rapidly to 25° C. The results are given in Table I.

TABLE I

| cc. HCl | Mols HCl per mol Melamine | pH Solution | Elapsed Time | Appearance |
|---|---|---|---|---|
| 2.4 | 0.2 | | 10 sec | White ppt. |
| | | | 2 months | No further change. |
| 4.9 | 0.4 | 3.02 | 3 hours | Sl. blue solution. |
| | | | 40 days | Clear blue colloid. |
| | | | 2 months | Blue gel. |
| 7.3 | 0.6 | 2.42 | 20 hours | Sl. blue solution. |
| | | | 40 days | Clear blue colloid. |
| | | | 2 months | Blue gel. |
| 12.2 | 1.0 | 1.85 | 10 hours | Blue colloidal solution. |
| | | | 5 days | Blue gel. |
| 14.7 | 1.2 | 1.40 | 5 hours | Blue solution. |
| | | | 44 hours | Cloudy blue-white solution. |
| | | | 100 hours | Blue-white gel. |
| 17.1 | 1.4 | 1.25 | 5 hours | Sl. blue solution. |
| | | | 20 hours | Cloudy blue solution. |
| | | | 44 hours | Blue-white gel. |
| | | | 4 days | White gel. |
| 19.6 | 1.6 | 1.00 | 5 hours | Blue solution. |
| | | | 20 hours | White colloid, near gel. |
| | | | 44 hours | White gel. |
| 24.5 | 2.0 | | 5 hours | Blue solution. |
| | | | 17 hours | White gel. |
| 27.0 | 2.2 | 1.00 | 1 hour | Blue colloidal solution. |
| | | | 1.5 hour | Blue-white colloid. |
| | | | 16 hours | White gel. |
| 28.2 | 2.3 | | 15 min | Dense blue colloid. |
| | | | 1 hour | White ppt. suspended in gel. |
| | | | 17 hours | Large white ppt. |
| 30.6 | 2.5 | 0.91 | 0.5 hour | Blue colloid. |
| | | | 2 hours | Dense colloid plus white ppt. |
| | | | 16 hours | White ppt. |

A general survey of syrup Nos. 3–9 at varying ratios of acid to melamine is given in Table II.

TABLE II

*HCl-modified urea-melamine copolymers*

| Ratio Acid to Melamine | Appearance of Product | | | | |
|---|---|---|---|---|---|
| | Up to 1 hr. | 1–8 hrs. | 1 day | Several Days to weeks | Weeks to Months |
| Very low | ppt | Same | Same | Same | Same. |
| Low | Cloudy | White opaque solution | do | do | White opaque gel. |
| Lower Borderline | Clear | Blue colloidal soln | do | Blue-white gel | Do. |
| "Stable" or Intermediate Zone | do | Clear soln | Sl. blue soln | Blue colloidal soln | Blue gel. |
| Upper Borderline | do | Blue colloidal soln | Blue gel | Blue-white gel | White opaque gel. |
| High | do | Blue-white soln | White gel | Same | Same. |
| Very high | Blue colloid | White colloid plus ppt | White ppt | do | Do. |

Figure 2:
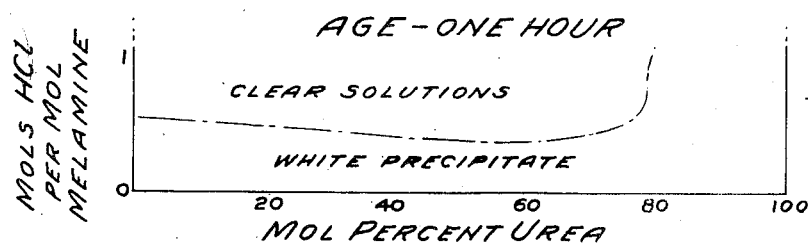
Figure 3:
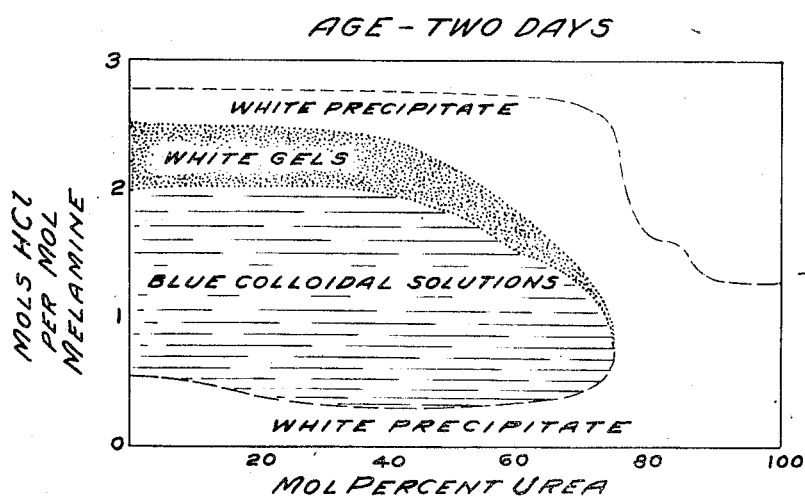
Figure 4:
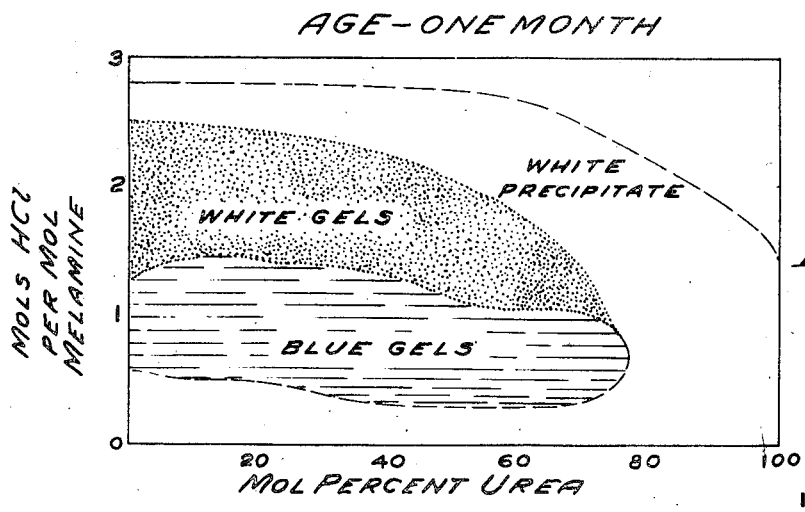

These results are shown graphically and in greater detail in Figs. 2, 3 and 4 of the drawings. Fig. 2 shows that condensation products containing up to slightly less than 80 mol percent of urea will dissolve to clear solutions in water containing a minimum of about 0.4 mol of HCl per mol of melamine. These clear solutions are converted on aging to the blue colloidal solutions in which the colloidal particles of resin copolymer possess cationic properties. Fig. 3 shows that the resin is precipitated when more than about 1.5 to 2.5 mols of HCl per mol of melamine is used, depending on the mol percent of urea in the composition.

Figs. 3 and 4 also illustrate another characteristic property of the colloidal melamine-urea-formaldehyde copolymer solutions; namely, their conversion to white gels upon further aging at higher HCl to melamine ratios. These gels are shown in Fig. 3 as having been formed from the originally clear but subsequently colloidal solutions at hydrochloric acid ratios of about 2–2.5 mols upon two days aging, while the same type of final products are obtained more slowly at ratios as low as 1–1.4 mols per mol of melamine as shown in Fig. 4. With still lower HCl:melamine ratios the colloidal blue solutions are stable for longer periods of time, but upon continued aging they form hydrophilic gels that can be redissolved by agitation. Additional aging gradually reduces their water-dispersibility until they finally reach the water-insoluble stage.

It should be emphasized that the boundaries between the various zones illustrated in the drawings are not sharply defined, since the products dealt with are colloidal in character. For example, the borderline gels in Fig. 4 vary from clear blue to white opaque through a series of blue-white gels of gradually increasing opacity. Both the nature of the final products and the rapidity through which the various cycles are passed are functions of the acid ratio. The white gels are formed relatively quickly (within 0.5–4 days) but the clear blue gels arrived at that condition only after weeks of aging.

*Example 4*

1. A substantially neutral melamine-urea-formaldehyde condensation product was made by heating together 0.7 gram mols of melamine, 0.3 gram mols of urea and 4.0 gram mols of aqueous 37% formaldehyde at reflux until the first hydrophobe was noted.

(a) A sample of the syrup was dissolved in water containing hydrochloric acid and the solution adjusted to 10% resin solids and 0.35 gram mols of HCl for each gram mol of resin. This solution was refluxed for five hours. The copolymer was then found to contain 2.7 mols of combined formaldehyde for each mol of urea+melamine.

(b) A second sample of the same solids and acid content was heated at 50° C. for 6 hours. The resin then contained 2.2 mols of combined formaldehyde for each mol of urea+melamine.

2. The above procedure was repeated by adding 0.7 gram mols of melamine and 0.3 gram mols of urea to 4.0 gram mols of aqueous 37% formaldehyde, but the slurry was then diluted to 10% resin solids and 0.35 gram mols of Hcl were added immediately.

(a) A sample of the mixture was refluxed for five hours. The copolymer was then found to contain 2.4 mols of combined formaldehyde.

(b) A second sample was heated at 50° C. for six hours. The combined formaldehyde was then 2.8 mols.

3. A melamine-urea-formaldehyde condensation product was made as in (1) but six mols of formaldehyde were used instead of four mols. Acidified solutions were made up to 10% resin solids and aged six days at 25° C.

(a) When 0.35 mols of HCl were used the aged copolymer contained 3.1 mols of combined form-aldehyde.

4. A 30:70 melamine-urea-formaldehyde resin was made by refluxing 0.3 gram mols of melamine, 0.7 gram mols of urea and 4.0 gram mols of formaldehyde to the first hydrophobe.

(a) A sample was made up with water to 10% solids and 0.15 mols HCl per mol of melamine+urea and refluxed five hours. The combined formaldehyde was 1.8 mols per mol of melamine+urea.

(b) A second sample of the same solution was heated at 50° C. for six hours. The combined formaldehyde was 1.7 mols.

5. A slurry of 0.3 gram mols of melamine, 0.7 gram mols of urea and 4.0 gram mols of formaldehyde was diluted with water to 10% solids.

(a) When 0.15 mols of HCl were added and the mixture heated as in 3(a) the combined formaldehyde was 1.8 mols.

(b) When the same mixture was heated as in 3(b) the combined formaldehyde was 1.9 mols.

6. A mixture of 0.6 gram mols of monomeric dimethylol urea and 0.4 gram mols of monomeric trimethylol melamine was made up to a 10% solution and 0.2 gram mols of HCl were added. After aging the solution at 25° C. for five days the copolymer was found to contain 2.0 mols of combined formaldehyde for each mol of melamine+urea.

7. A resin syrup was made by refluxing 0.3 gram mols of melamine and 0.7 gram mols of urea with 6 gram mols of 37% aqueous formaldehyde to the first hydrophobe. 10% aqueous solutions were acidified with 0.15 mol HCl and aged six days at 25° C. The combined formaldehyde in the copolymer was 2.2 mols.

8. The procedure of (7) was repeated using 2.4 mols of formaldehyde instead of 6 mols. The 10% aqueous solution contained 0.15 mol HCl and was aged six days at 25° C. The colloidal resin then contained 1.3 mols of combined formaldehyde.

It is evident from these figures that the aged melamine-urea-formaldehyde copolymers can be prepared with a minimum of about 1 mol of combined formaldehyde for each mol of melamine+urea or with a maximum of about 4 mols, depending on the ratio of melamine to urea and the quantity of formaldehyde used. In this respect they are quite different from the colloidal cationic melamine-formaldehyde resin solutions, wherein the content of combined formaldehyde is always about 2–2.5 mols regardless of the amount of formaldehyde originally employed.

*Example 5*

A melamine-urea-formaldehyde condensation product was prepared as described in Example 1, using 70.5 pounds of urea, 63.5 pounds of melamine and 317 pounds of 36% aqueous formalin. The resulting syrup, containing 55% resin solids, was dissolved in acidified water at 120° F., using 100 pounds of water and 3.65 pounds of 20° Bé. hydrochloric acid for each 59 pounds of syrup. Enough cold water was then added to make a total of 260 pounds and the solution was aged 14 hours at room temperature.

A number of batches of aged copolymer resin solution were prepared by this procedure and added to the stock suspension in a paper mill. The furnish was a mixture of 50% sulfite pulp and 50% soda pulp containing 3.5% clay filler, 2.5% rosin size, and 3.0% alum, all based on the dry weight of the paper fiber.

The aged resin solution was added to each beater as it was dumped, using 2% of resin on the dry weight of the fiber. The beater stock was diluted with water to about 0.5–1% solids and run out on a Fourdrinier machine in the usual manner at a machine speed of 287 ft./min. with 12 pounds steam pressure on all driers.

Sheets from this run were tested and the results are given in the following table, the resin being designated as "M. U. F." The figures are the average of a large number of individual measurements.

Another run was made in the same mill with a colloidal cationic melamine-formaldehyde resin solution and the test results are also given in the table for purposes of comparison, the resin being designated at "M. F."

|  | M. F. Resin | M. U. F. Resin |
|---|---|---|
| Resin Added | 2.0 | 2.0 |
| Resin Retained | 1.7 | 1.4 |
| Basis Wt. 25 x 40–500 | 60.8 | 60.2 |
| Tensile (lb./inch): |  |  |
| Machine Direction— |  |  |
| Dry | 30.4 | 32.8 |
| Wet | 7.2 | 6.8 |
| Cross Direction— |  |  |
| Dry | 17.6 | 16.8 |
| Wet | 5.4 | 4.4 |
| Extra Oven Cure, 10'250° F. Wet (M. D.) | 9.6 | 9.2 |
| Burst Point Mullen: |  |  |
| Dry | 37.5 | 37.7 |
| Wet | 13.2 | 12.0 |
| Wet Rub (double rubs): |  |  |
| Machine Direction— |  |  |
| Felt: |  |  |
| Peel | 240 | 150 |
| Wear through | 835 | 670 |
| Wire: |  |  |
| Peel | 50 | 22 |
| Wear through | 1,135 | 535 |
| Cross Direction— |  |  |
| Felt: |  |  |
| Peel | 65 | 35 |
| Wear through | 1,025 | 650 |
| Wire: |  |  |
| Peel | 20 | 8 |
| Wear through | 515 | 330 |
| Water Resistance, Currier (sec.): |  |  |
| Hard | 38.0 | 36.2 |
| Slack | 128.5 | 111.2 |
| Ink Penetration, seconds B. K. & Y. | 1,350 | 480 |
| Fold MIT | 94 | 129 |
| Tear (gr.) (6 sheets): |  |  |
| Machine Direction | 74 | 80 |
| Cross Direction | 70 | 84 |

These figures show that wet strength and other improvements are obtained with the copolymer resin solutions of the present invention, and that the results are comparable with those produced by a straight melamine-formaldehyde resin.

Reference is made to our copending application Serial No. 80,578, filed March 9, 1949, which describes and claims colloidal aqueous solutions of resinous copolymers of melamine, urea and formaldehyde acidified with from 1.5 to 6 mols of acetic acid for each mol of melamine.

We claim:

A colloidal aqueous solution of a resinous copolymer of melamine, urea and formaldehyde which contains 1 to 70 mol percent of urea and 30 to 99 mol percent of melamine and about 1 to 4 mols of combined formaldehyde for each mol of melamine+urea, said solution being acidified to a pH within the range of 0.25 to 4 by a content of 0.2 to 2.5 mols of hydrochloric acid for each mol of melamine, said resinous copolymer having a degree of polymerization such that the dispersed particles thereof are colloidal in character and size.

HENRY P. WOHNSIEDLER.
WALTER M. THOMAS.

(References on following page)

REFERENCES CITED

The following references are of record in the file of this patent:

UNITED STATES PATENTS

| Number | Name | Date |
|---|---|---|
| 2,255,901 | Schroy | Sept. 16, 1941 |
| 2,315,402 | D'Alelio | Mar. 30, 1943 |
| 2,325,375 | D'Alelio | July 27, 1943 |
| 2,328,425 | D'Alelio | Aug. 31, 1943 |
| 2,331,446 | Widmer | Oct. 12, 1943 |
| 2,345,543 | Wohnsiedler | Mar. 28, 1944 |
| 2,418,525 | Pollak | Apr. 8, 1947 |

OTHER REFERENCES

Maxwell, Section of Technical Association of Pulp and Paper Industry, vol. 116, No. 19, pp. 39–42, May 13, 1943.